April 4, 1967 D. A. GOETZ ETAL 3,312,438
SUPPORT FOR TABLE LEGS AND THE LIKE
Filed Nov. 29, 1965 2 Sheets-Sheet 1
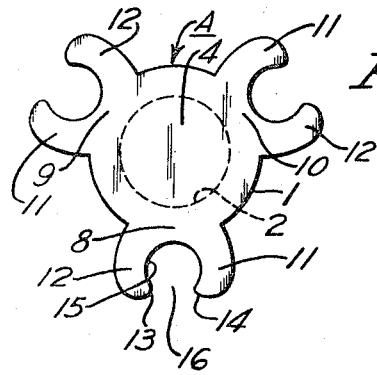
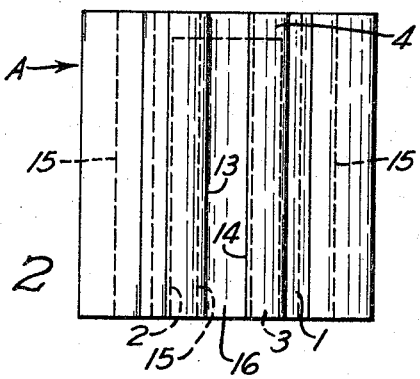
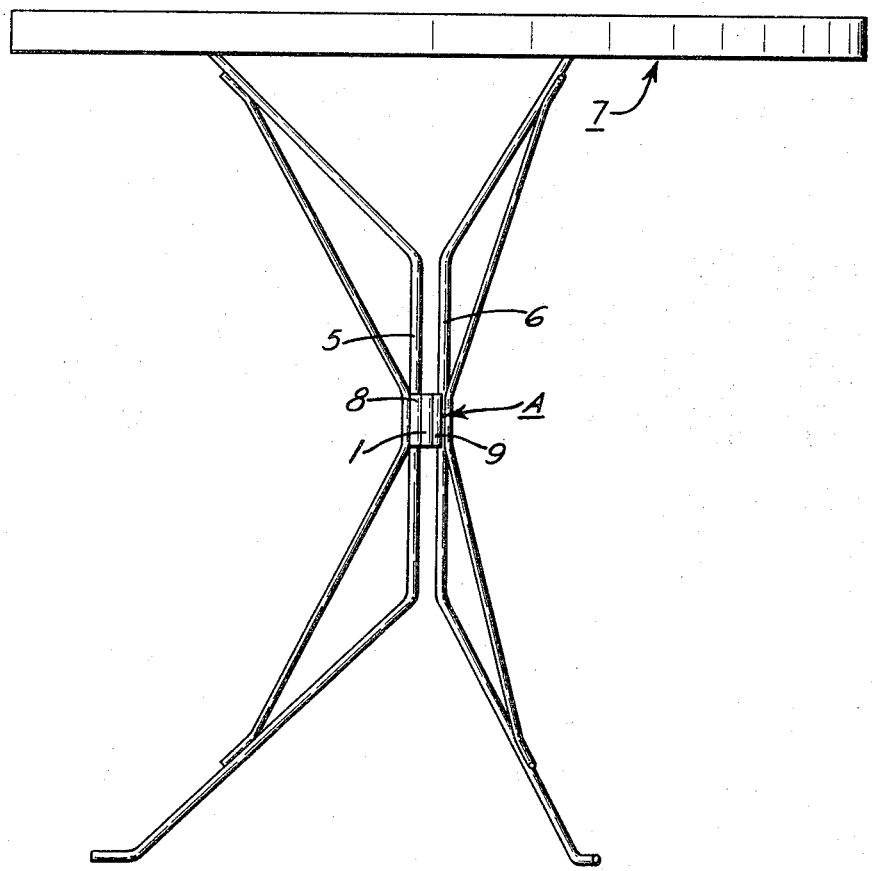
INVENTORS.
DANIEL A. GOETZ
MILAN GRUBER
BY
Webb, Burden, Robinson & Webb
ATTORNEYS.

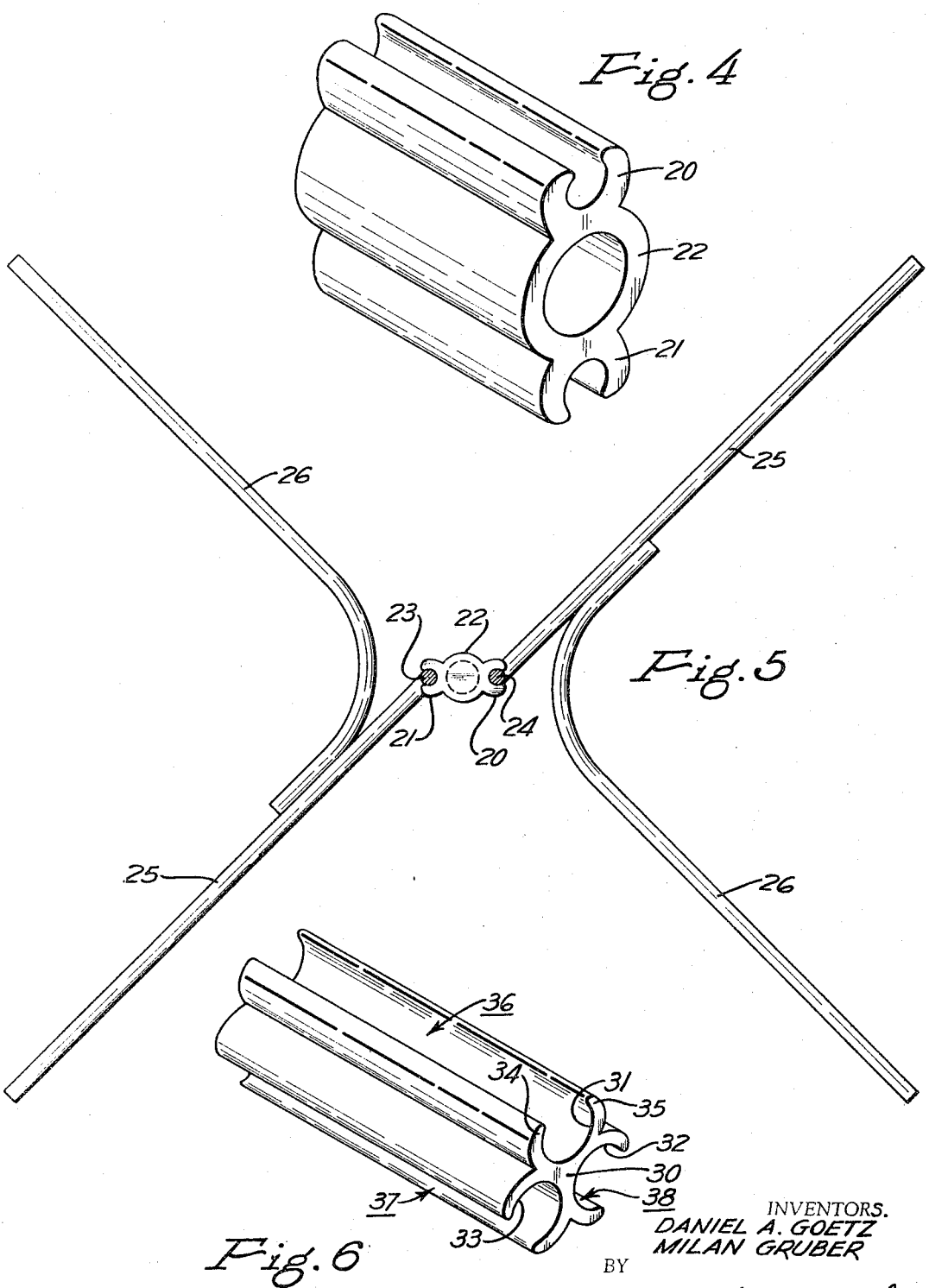

United States Patent Office 3,312,438
Patented Apr. 4, 1967

3,312,438
SUPPORT FOR TABLE LEGS AND THE LIKE
Daniel A. Goetz, Mount Lebanon, and Milan Gruber, Aliquippa, Pa., assignors to Stylette Plastics, Inc., Oakdale, Pa.
Filed Nov. 29, 1965, Ser. No. 510,348
5 Claims. (Cl. 248—165)

The invention relates to a support for legs of a table, stand, stool, pedestal or other similar article of manufacture wherein the support receives and detachably retains the legs in a vertical position for mounting the top of a table or the seat of a stool, etc. This support has special utility for tables which are sold and marketed disassembled and are easily assembled by a purchaser who attached three legs, for example, to the support and then mounts the top of the table upon the legs. The legs are simply snapped into sockets of the support and there retained by arms or fingers which are joined to the support and define the socket. These arms are made from a material which has both resiliency to permit insertion of the leg into and its removal from the socket, and semi-rigidity which enables the arms to retain and maintain the leg in a vertical position for mounting the table top.

Heretofore, in many instances, assembly of legs of a table included use of screws, bolts, washers and nuts, brackets, clamps, clips and various other kinds of fasteners, and use of tools such as screwdrivers, pliers, wrenches, etc. Also, when the table was sold disassembled, detailed instructions for assembly and sometimes a number of illustrations depicting stages or steps of assembly were required.

The support of this invention renders assembly of legs of a table, stool, and the like extremely simple and quick, and eliminates any need for screws, bolts, nuts, fasteners, clamps, etc., as well as tools. Furthermore, instructions for assembly can be brief, direct and easy to follow when the support is the element which receives and maintains the legs in their required vertical position. Specifically, the support comprises a base member with at least two socket-defining elements joined thereto and disposed therearound to vertically support the legs of a table. Each socket element comprises a pair of arms which extend outwardly from the base member which define interiorly therebetween at least a portion of a substantially vertically extending socket for receiving and detachably engaging a portion of the length of a leg of the table and which are made from a resilient, semi-rigid material. The outer ends of each pair of arms are spaced apart to form an opening into the socket. The distance between the outer ends is such that the portion of the length of the leg can be inserted into the socket and such that the arms detachably retain the leg therein.

In the accompanying drawings, we have shown three preferred embodiments of our invention in which:

FIGURE 1 is a plan view of one embodiment of our support;
FIGURE 2 is a side elevation view of the support of FIGURE 1;
FIGURE 3 is a side elevation view of a table with the support of FIGURE 1 locating and holding the legs of the table;
FIGURE 4 is a perspective view of a second embodiment of our support;
FIGURE 5 is a plan view of the support of FIGURE 4 with table legs positioned and mounted by the support; and
FIGURE 6 is a perspective view of a third embodiment of our support.

Referring to FIGURES 1, 2 and 3, the support A is a single piece made from high density polyethylene in an injection molding process and comprises a central cylindrical base member 1. Extending longitudinally of the base member is an axial bore 2 with an opening 3 at one end and a closure 4 at the other end.

In FIGURE 3 the support holds together three legs (2 legs 5 and 6 being shown) of a table 7 in a vertical position and this support is the major element which retains the three legs in vertical alignment and position.

Spaced apart an equal distance around the periphery of the base member 1 and extending longitudinally for the length of the base member are three socket-defining elements 8, 9 and 10, integral with the base member 1. As shown, each element comprises a pair of arms or fingers 11 and 12 which extend outwardly from the periphery of the base member with their outer ends 13 and 14 spaced apart. The two arms form interiorly therebetween a socket 15 which conforms to a cylindrical leg of the table and which has a cross-sectional dimension such that the interior walls of the socket engage the exterior surface of the leg for substantially the length of the socket.

The outer ends of the arms 11 and 12 are spaced apart to form an opening 16 into the socket and are a distance apart such that a leg can be entered into the socket and once disposed therein the arms retain and maintain the leg in a vertical position to support the table. However, this distance between the outer ends of the arms is also such that the leg can be removed from the socket. As shown, the arms extend around the periphery of the leg more than half way.

We have found that for a leg 7/32" in diameter, the distance between the outer ends 13 and 14 of the arms 11 and 12 is about 65%–75% of the diameter of the leg and that for a ½" diameter leg, the distance between the outer ends of the arms is about 78%–85% of the diameter of the leg. Thus, the distance between the outer ends of the arms must not be greater than about 85% of the diameter of the leg.

Ability to insert a leg into the socket, to maintain it within the socket during service and to remove it therefrom is dependent upon the material from which the arms are made and upon the distance between the outer ends of these arms. This material must be both resilient and semi-rigid and its yield point is not exceeded by attachment and detachment of the legs.

Polyethylenes from which the supports of FIGURES 1–5 can be made have the following physical properties:

| Property | ASTM Test Procedure | Units | One Specific Polyethylene | Polyethylene Range |
|---|---|---|---|---|
| Density | D1505 | G./cc. | 0.960 | 0.945–0.965 |
| Melt Index | D1238 | G./10 minutes | 12.0 | 1–20 |
| Tensile Yield | D638 | P.s.i. | 3,800 | 1,200–5,000 |
| Stiffness | D747 | P.s.i. | 100,000 | 15,000–160,000 |
| Impact Strength | D256 | Ft. lbs./inch of notch. | 0.8 | >0.5 |
| Hardness (Shore "D") | D1706 |  | 69 | 40–80 |
| Brittleness Temperature | D746 | ° F. | <−100 | <0 |

Other examples of materials for the support include polypropylene, polycarbonate, polystyrene, a thermoplastic resin $[-(-OCH_2-)_n]$, polyamide and possibly some metals such as steel, aluminum, etc.

FIGURES 4 and 5 show a second embodiment of the support which is substantially the same as that of FIGURES 1, 2 and 3 except that there are two socket-defining elements 20 and 21 spaced diametrically apart around the base member 22. These two socket-defining elements receive table legs 23 and 24, each of which have two foot members 25 and 26 as shown.

FIGURE 6 shows a third embodiment of the support which has been used for ½" diameter rods for a table. In this embodiment, the base member 30 partially defines each socket of the three sockets 31, 32 and 33, and the arms 34 and 35 of the three socket-defining elements 36, 37 and 38 define the remainder of the socket with the outer ends of the arms extending more than half way around the periphery of a rod inserted into the socket. Of course, the outer ends of the arms are spaced apart to form an opening into each socket.

While we have shown and described the preferred embodiments of our invention, it may otherwise be embodied within the scope of the appended claims.

We claim:

1. In a table structure and the like having a horizontal top and at least two legs for carrying the top, each of said legs having a substantially vertically extending portion, said portions being laterally spaced apart from one another, the combination with said legs of at least one support for receiving and detachably retaining the legs in such spaced relation, said support being made of a resilient, semi-rigid material and comprising:
   (A) a base member; and
   (B) at least two socket-defining elements integral with the base member, each of said elements including a pair of arms which extend outwardly from the base member to form therebetween a substantially vertically extending socket for receiving and detachably engaging said vertically extending portion of a leg of the table, the outer ends of each pair of arms forming an opening into the socket and being spaced apart a distance not greater than the maximum cross-sectional dimension of said vertically extending portion of a leg which is to be inserted therebetween, such that when each of the legs is inserted into a socket in the support the arms of the socket detachably retain the legs therein to support the top of the structure.

2. In a table structure as set forth in claim 1, and wherein the base member partially forms each socket-defining element, such that the base member is solid throughout its entire length.

3. In a table structure as set forth in claim 1 wherein the base member is a cylindrical member to which the socket-defining elements are integrally joined, the cylindrical member having an axial bore therein which extends substantially the length of the support, said bore being closed on an end to provide rigidity to the support to prevent compression of the bore when a leg is inserted into a socket of the support.

4. In a table structure as set forth in claim 1, wherein the table legs are circular in cross-section and the outer ends of each pair of arms are spaced apart a distance not greater than 85% of the diameter of a leg to be detachably retained thereby.

5. In a table structure as set forth in claim 4, wherein the outer end of each pair of arms extends more than 25% around the circumference of a leg to be detachably retained thereby.

References Cited by the Examiner

UNITED STATES PATENTS

| | | | |
|---|---|---|---|
| 398,508 | 2/1889 | Hatch | 248—229 X |
| 1,477,233 | 12/1923 | Alexander | 248—165 X |
| 1,548,410 | 8/1925 | Derbyshire | 248—165 X |
| 1,959,633 | 5/1934 | Madden | 138—12 |
| 2,388,297 | 11/1945 | Slaughter | 154—42 |
| 2,639,820 | 5/1953 | Lee | 211—163 |
| 2,764,379 | 9/1956 | Schmidt | 248—158 |
| 2,902,821 | 9/1959 | Kelly | 59—80 |
| 3,043,902 | 7/1962 | Klein | 174—146 |
| 3,084,892 | 4/1963 | Priestley et al. | 248—61 |

FOREIGN PATENTS

| | | |
|---|---|---|
| 1,003,303 | 2/1957 | Germany. |
| 451,510 | 9/1949 | Italy. |
| 560,916 | 4/1957 | Italy. |

CLAUDE A. LE ROY, *Primary Examiner.*